(12) United States Patent
Lee et al.

(10) Patent No.: US 10,077,022 B2
(45) Date of Patent: Sep. 18, 2018

(54) DEVICE FOR INTEGRITY VERIFICATION OF IMAGE DATA AND METHOD FOR INTEGRITY VERIFICATION USING THE SAME

(71) Applicant: Korea University Research and Business Foundation, Seoul (KR)

(72) Inventors: Heejo Lee, Seoul (KR); Jieun Song, Suwon-si (KR); Kiryong Lee, Daegu (KR); Wan Yeon Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 146 days.

(21) Appl. No.: 15/223,313

(22) Filed: Jul. 29, 2016

(65) Prior Publication Data

US 2017/0247017 A1    Aug. 31, 2017

(30) Foreign Application Priority Data

Feb. 26, 2016    (KR) .................. 10-2016-0022977

(51) Int. Cl.
| | |
|---|---|
| *G06F 17/30* | (2006.01) |
| *B60R 25/30* | (2013.01) |
| *G06T 1/00* | (2006.01) |
| *G06Q 50/26* | (2012.01) |

(52) U.S. Cl.
CPC ...... *B60R 25/302* (2013.01); *G06F 17/30244* (2013.01); *G06F 17/30371* (2013.01); *G06T 1/0021* (2013.01); *G06Q 50/265* (2013.01)

(58) Field of Classification Search
CPC .... G06K 9/4652; G06K 9/6202; H04N 9/735; G06T 5/20; G06T 7/401; G06T 7/408; G06T 7/003; G06T 2207/10024
USPC ........................................... 382/100
See application file for complete search history.

(56) References Cited

U.S. PATENT DOCUMENTS

2003/0223099 A1* 12/2003 Fan .................. G06T 1/0071
                                                     358/537

FOREIGN PATENT DOCUMENTS

| JP | 2005143094 A | 6/2005 |
|---|---|---|
| JP | 2009265927 A | 11/2009 |
| KR | 20120037076 A | 4/2012 |
| KR | 101593008 B1 | 2/2016 |

* cited by examiner

*Primary Examiner* — Amandeep Saini
(74) *Attorney, Agent, or Firm* — Fox Rothschild LLP

(57) ABSTRACT

A device for integrity verification of image data. The device comprises: a database configured to store multiple field signatures respectively corresponding to multiple editing tools; a memory configured to store a program for integrity verification of image data; and a processor configured to execute the program stored in the memory. The processor: extracts a field from the image data when the program is executed; determines whether or not there is a field signature matched with the extracted field from among the multiple field signatures; and determines whether or not the image data are edited depending on a result of the determination.

6 Claims, 9 Drawing Sheets

| EDITING TOOL | VERSION | NUMBER OF RENDERING OPTIONS | NUMBER OF SIGNATURES |
|---|---|---|---|
| Adobe Premiere™ | CS3 | 16,200 | 2 |
| | CS4 | 24,300 | 2 |
| | CS5 | 18,225 | 2 |
| | CS6 | 32,400 | 2 |
| | CC | 16,200 | 2 |
| Sony Vegas™ | 9 | 24,576 | 2 |
| | 10 | 24,576 | 2 |
| | 11 | 24,576 | |
| | 12 | 32,768 | |
| | 13 | 32,768 | |
| Avid Media Composer™ | 5 | 3,072 | 1 |
| | 6 | 2,048 | |
| | 7 | 1,024 | |
| Edius™ | 6 | 8,192 | 2 |
| | 7 | 32,768 | |
| Avid Studio™ | 1.1 | 12,288 | 1 |
| Total | 16 | 305,981 | 18 |

DEVICE FOR INTEGRITY VERIFICATION OF IMAGE DATA AND METHOD FOR INTEGRITY VERIFICATION USING THE SAME

CROSS-REFERENCE TO RELATED APPLICATION

This application claims the benefit under 35 USC 119(a) of Korean Patent Application No. 10-2016-0022977 filed on Feb. 26, 2016, in the Korean Intellectual Property Office, the entire disclosures of which are incorporated herein by reference for all purposes.

TECHNICAL FIELD

The present disclosure relates to a device for integrity verification of image data and a method for integrity verification using the same.

BACKGROUND

Black box is a common name for a device installed in a transport to record information. For example, the black box may include recorders for all kinds of transports, such as a flight data recorder (FDR), a voyage data recorder (VDR), and an event data recorder (EDR).

The FDR is installed in an aircraft to record conditions of the aircraft, audio information in the cockpit, audio information of communications, etc. The VDR is installed in a ship to record operation conditions of various nautical instruments, contents transmitted and received by a communication device, video or audio information in the wheelhouse, etc. Further, the EDR is installed in a car or a bicycle to record video information recording inside and outside of the vehicle and audio information recording sounds in the vehicle in case of an accident.

Image data recorded from a black box have been used as an important evidence in analyzing an accident or crime. However, the image data can be easily modulated using an editing tool. Particularly, with the advancement of editing technology using editing tools, image data modulated using a recently developed editing tool cannot be recognized with the naked eye. Accordingly, techniques for guaranteeing integrity of image data and easily detecting modulation are being developed.

In particular, the Korean Agency for Technology and Standards established the KS black box standards, KS-R-5078 (entitled "Image-based accident recorder for vehicle"), in June 2011 to recommend a black box to be equipped with a system that guarantees integrity of data and detects modulation.

Examples of conventional methods for guaranteeing integrity of image data may include a method of inserting a digital watermark into image data and a method of calculating a hash value of image data using a hash function and storing the hash value with the image data.

In this regard, Korean Patent No. 10-1593008 (entitled "Method and system for generating integrity verification data") discloses a method and a system for verifying integrity of image data by applying a logical operation to a hash value for each of blocks included in the image data.

SUMMARY

In view of the foregoing, the present disclosure provides a device for integrity verification of image data which is capable of verifying integrity of image data and detecting modulation on the basis of a data structure of the image data, and a method for integrity verification using the same.

However, problems to be solved by the present disclosure are not limited to the above-described problems. There may be other problems to be solved by the present disclosure.

As a technical means for solving the above-described problem, in accordance with a first aspect of the present disclosure, a device for integrity verification of image data, includes: a database configured to store multiple field signatures respectively corresponding to multiple editing tools; a memory configured to store a program for integrity verification of image data; and a processor configured to execute the program stored in the memory. The processor: extracts a field from the image data when the program is executed; determines whether or not there is a field signature matched with the extracted field from among the multiple field signatures; and determines whether or not the image data are edited depending on a result of the determination.

In accordance with a second aspect of the present disclosure, a method for integrity verification in a device for integrity verification of image data is provided. The method includes: extracting a field from image data; and determining whether or not the image data are edited on the basis of whether or not there is a field signature matched with a field extracted during the extracting of a field from among multiple field signatures stored in a database.

According to the image data integrity verification device and the integrity verification method using the same, it is possible to verify integrity of image data and determining whether or not the image data are modulated on the basis of field signatures corresponding to multiple editing tools and stored in the database and a field extracted from a head of the image data. Further, according to the image data integrity verification device and the integrity verification method using the same, a field signature can be added to the database 130, and, thus, it is possible to verify integrity of image data generated by a new editing tool or various options of an editing tool.

Therefore, according to the image data integrity verification device and the integrity verification method using the same, it is possible to verify integrity of image data independently of an image recorder. Further, the image data integrity verification device and the integrity verification method using the same are not affected by an image quality of image data unlike a conventional method of verifying integrity by detecting statistical characteristics and traces of editing in image data. The image data integrity verification device and the integrity verification method using the same can more rapidly detect modulation of image data than the conventional method.

As such, the image data integrity verification device and the integrity verification method using the same enable a user unfamiliar with photos to easily and rapidly detect modulation of image data and an editing tool used for modulation. Therefore, the image data integrity verification device and the integrity verification method using the same can be used for detection of modulation of image data which are relevant to an accident, an event, and a crime and collected by an image collecting device such as a black box or a CCTV.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

Hereinafter, an image data integrity verification device 100 will be described with reference to FIG. 1 to FIG. 7B.

Figure 1:
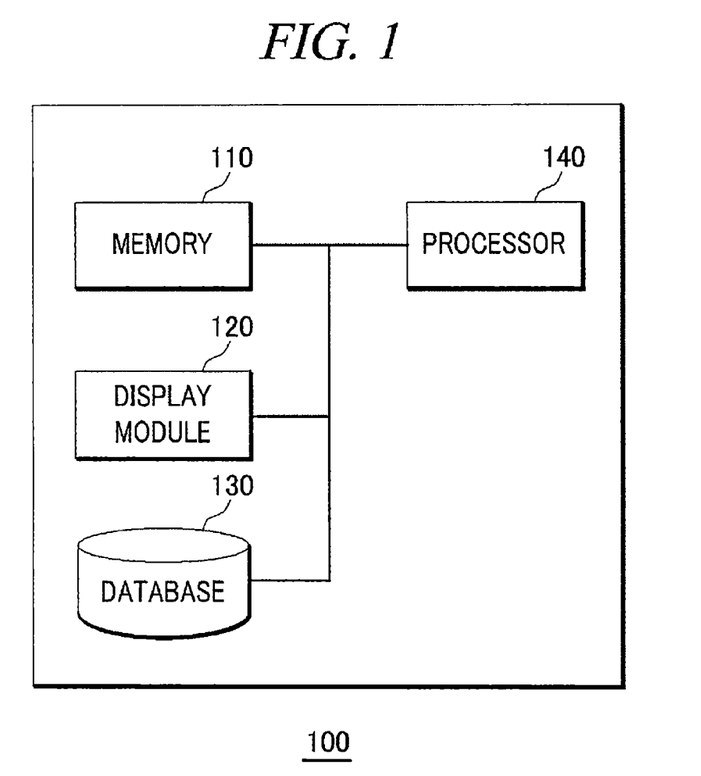
FIG. 1 is a block diagram of the image data integrity verification device.

FIG. 1 is a block diagram of the image data integrity verification device 100.

The image data integrity verification device 100 may determine whether or not a signature of an image editing tool is included in metadata of image data to detect whether or not image data are modulated.

In general, if image data are edited using an image editing tool, the image editing tool records metadata corresponding to an editing tool in a header of the image data. Thus, the image data integrity verification device 100 can extract the metadata included in the image data, analyze the extracted metadata, and determine whether or not the image data are edited.

Referring to FIG. 1, the image data integrity verification device 100 includes a memory 110, a display module 120, a database 130, and a processor 140.

The memory 110 is configured to store an image data integrity verification program. Herein, the memory 110 is a common name for a non-volatile storage device that keeps stored information even if power is not supplied and a volatile storage device that requires power to keep stored information.

The display module 120 is configured to display a user interface for integrity verification.

The database 130 is configured to store multiple field signatures for integrity verification of image data. Herein, the multiple field signatures may correspond to multiple editing tools, respectively.

The processor 140 is configured to determine whether or not image data are edited when the image data integrity verification program stored in the memory 110 is executed.

Herein, the image data may be video data or still image data. Further, the image data may be image data collected by an image data collecting device.

The image collecting device may be a black box installed in a transport. Further, the image collecting device may be a computing device connected directly or indirectly to a closed-circuit television (CCTV) and a camera and configured to collect image data, but is not limited thereto.

The editing tool may be an application capable of editing image data. For example, the editing tool may include commonly used editing tools, such as "Adobe Premiere™", "Sony Vegas™", "Avid Media Composer™", "Edius™", "Avid Studio™", and "Final Cut™", mainly used for editing image data. Herein, the commonly used editing tools are not limited to the above-described products.

An image data integrity verification process performed by the image data integrity verification device 100 will be described in detail with reference to FIG. 2.

Figure 2:
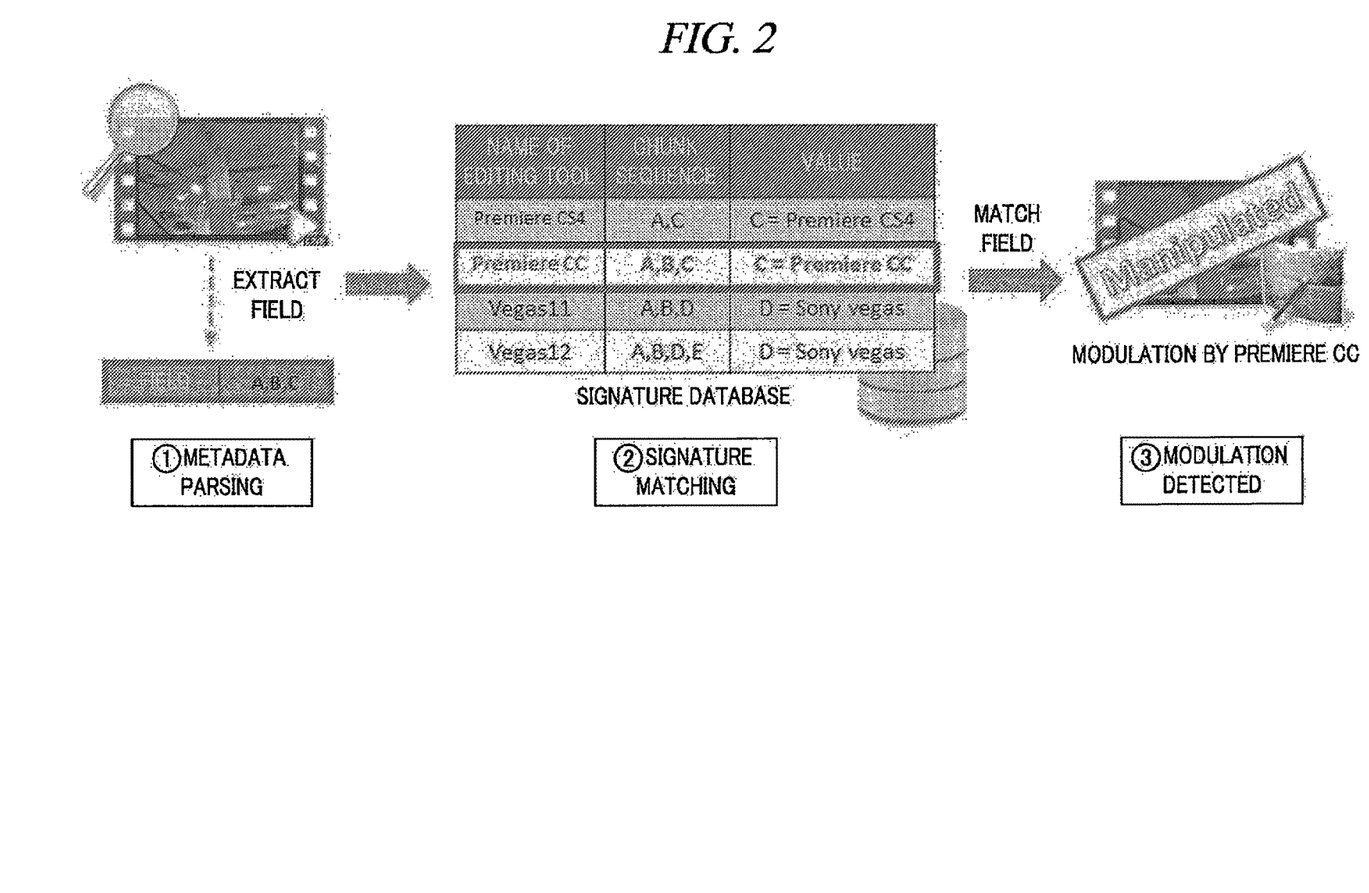
FIG. 2 is an exemplary diagram of a process for integrity verification of image data.

FIG. 2 is an exemplary diagram of a process for integrity verification of image data.

For example, the processor 140 may extract a field from the image data collected by the image data collecting device.

In this case, the processor 140 may extract the field from a header of the collected image data. The header of the image data may include one or more chunks. Therefore, the field extracted from the header may include a chunk sequence including one or more chunks.

Referring to FIG. 2, the field extracted by the processor 140 may include a sequence "ABC" of chunks "A", "B", and "C".

Further, the processor 140 may compare the extracted field with a field signature corresponding to the multiple editing tools stored in the data base 130. In this case, the field signature stored in the database 130 may include information of the editing tools and a chuck sequence corresponding to the editing tools.

Therefore, the processor 140 may extract a field signature matched with the extracted field from among field signatures corresponding to the multiple editing tools stored in the database 130.

If there is no field signature matched with the extracted field, the processor 140 may determine that the image data are not edited.

However, if there is a field signature matched with the extracted field, the processor 140 may determine that the image data are modulated. Further, the processor 140 may use the information of the editing tools to detect the kind of an editing tool used for editing.

Referring to FIG. 2 again, the processor 140 may select a field signature of an editing tool "Adobe Premiere CC™" as the field signature matched with the extracted field. The processor 140 may determine whether or not the image data are modulated on the basis of information included in the selected field signature. Further, the processor 140 may detect "Adobe Premiere CC™" as the kind of the editing tool corresponding to the image data.

Figure 3:
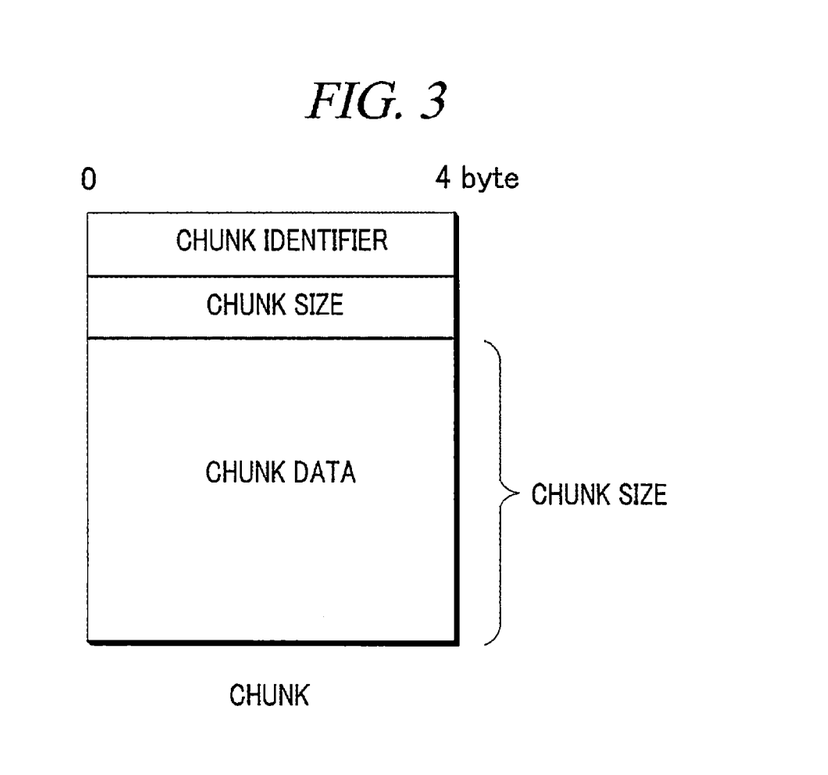
FIG. 3 is a block diagram of a chunk.

Meanwhile, the image data may include multiple chunks in the header. In this case, each chunk may include a chunk identifier, a chunk size, and chunk data, as illustrated in FIG. 3. The chunk size may be a size of the chuck data.

FIG. 3 is a block diagram of a chunk.

The processor 140 may inspect all of the multiple chunks included in the image data and determine whether or not the image data are edited. In this case, the processor 140 may determine whether or not the image data are edited by using only chunk identifiers included in the chunks rather than inspecting all of the multiple chunks.

To be specific, the processor 140 may extract a chunk identifier from a chunk. The processor 140 may determine whether or not the image data are edited by using the extracted chunk identifier. Therefore, the processor 140 may omit an inspection of chunk data included in the chunk. That is, the processor 140 may extract a chunk identifier and a chunk size included in a specific chunk and may perform an inspection of all chunks by skipping chunk data using the extracted chunk size and moving to a next chunk.

In this case, some chunks may include a sub-chunk or multiple sub-chunks having a tree structure. Further, some chunks may include a type value corresponding to a chunk identifier.

Figure 4:
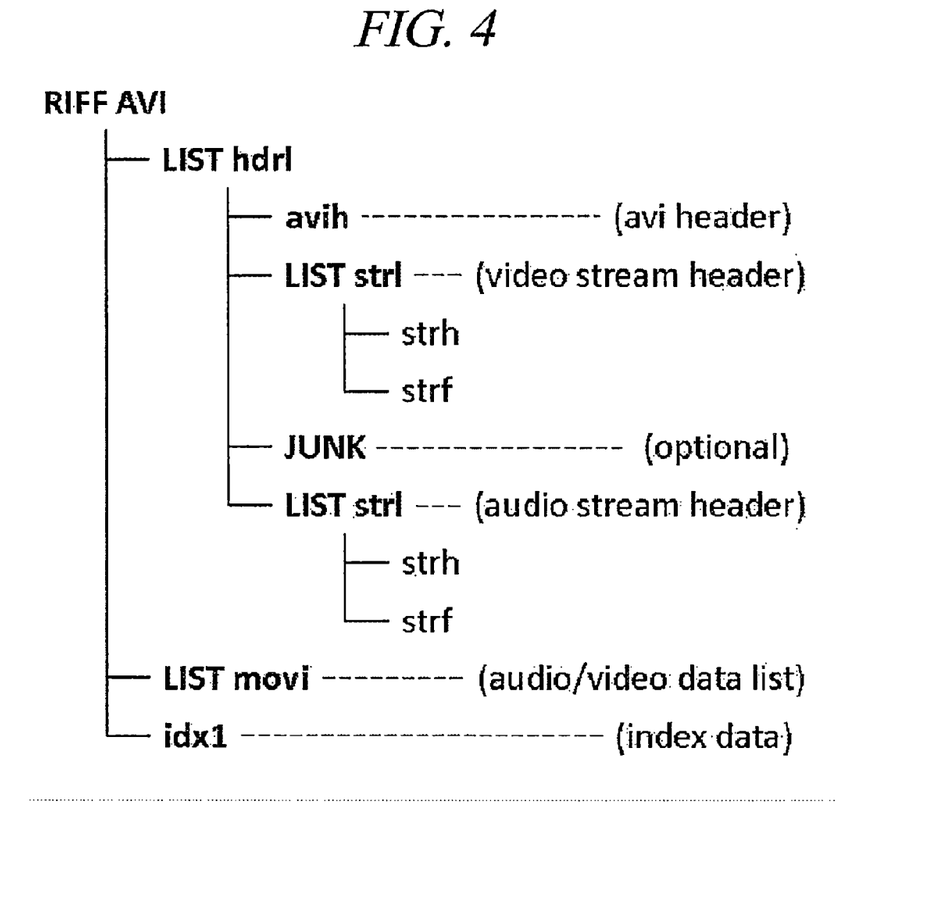
FIG. 4 illustrates a file structure of image data in a typical AVI file format.

FIG. 4 illustrates a file structure of image data in a typical AVI file format.

For example, a chunk identifier "RIFF" included in image data in the AVI file format may include multiple sub-chunks having a tree structure as shown in FIG. 4 or type values. Therefore, if a chunk identifier is "RIFF", the processor 140 may perform an inspection of the sub-chunks or extract a type value.

Further, referring to FIG. 4, if a chunk identifier is "LIST", a corresponding chunk ma include a video stream and an audio stream included in image data, and type values corresponding to a video/audio data list. Therefore, if a chunk identifier is "LIST", the processor 140 may extract type values "strh" and "strf" included in the chunk data.

That is, with respect to some predetermined chunk identifiers such as "RIFF" and "LIST", the processor 140 may extract types included in chunk data or inspect sub-chunks included therein.

Further, with respect to other chunk identifiers except the some predetermined chunk identifiers, the processor 140 may extract the chunk identifiers but skip an inspection of chunk data.

Figure 5:
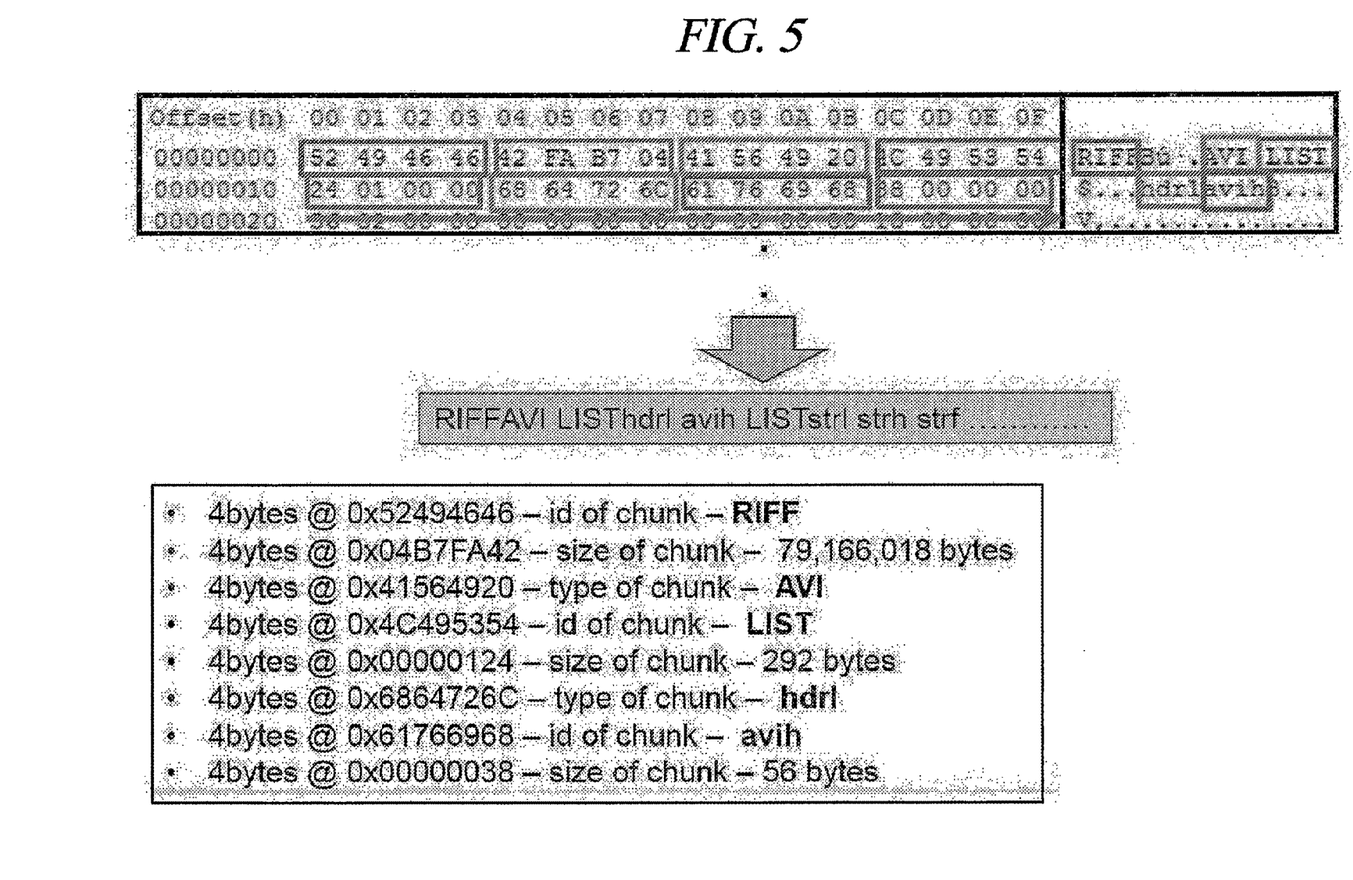
FIG. 5 is an exemplary diagram of a process for extracting a chunk sequence.

FIG. 5 is an exemplary diagram of a process for extracting a chunk sequence.

For example, the processor 140 may extract a chunk sequence from multiple chunks as illustrated in FIG. 5. Referring to FIG. 3 again, the chunk identifier and the chunk size may be 4 byte. Therefore, the processor 140 may analyze "52 49 46 46" stored at first 4 byte and thus extract a chunk identifier "RIFF". Then, the processor 140 may analyze "42 FA B7 04" stored at subsequent 4 byte and thus extract a chunk size "79,166,018 byte". Since the extracted chunk identifier is "RIFF", the processor 140 may analyze "41 56 49 20" stored at subsequent 4 byte and thus extract a type value "AVI".

As such, the processor 140 may extract chunk sequences from all chunks included in a header of image data. Herein, since the processor 140 extracts a chunk sequence on the basis of a chunk identifier and a chunk size, time complexity can be O(1).

Further, the processor 140 may determine whether or not image data are edited by comparing the extracted chunk with field signatures stored in the database 130. In this case, the field signatures stored in the database 130 may be extracted using image data generated by an editing tool. The field signatures stored in the database 130 are as shown in FIG. 6.

Figure 6:
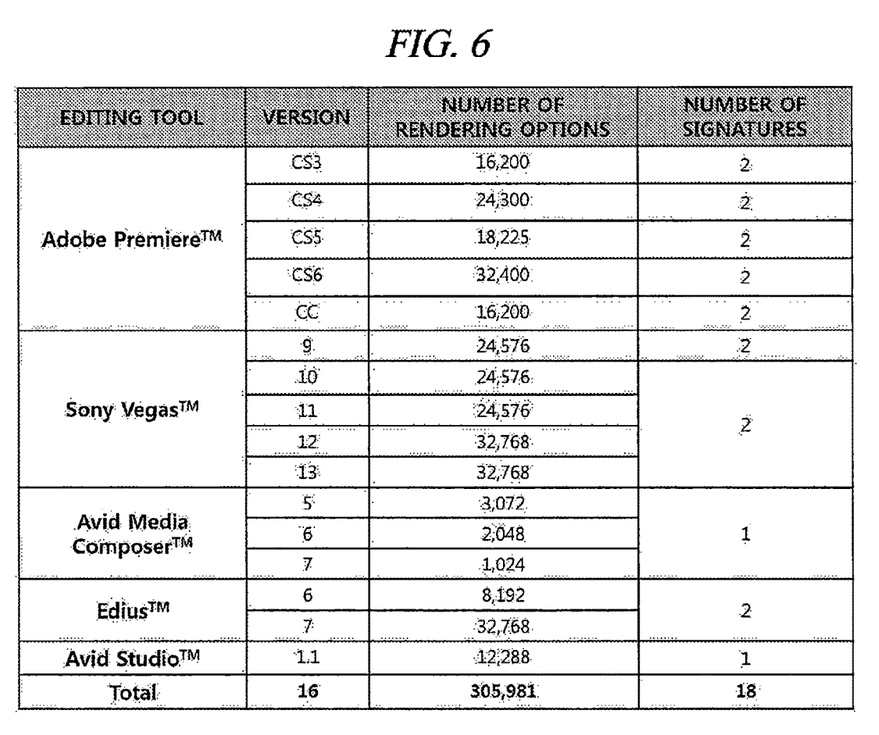
FIG. 6 is an exemplary diagram of field signatures stored in the database.

FIG. 6 is an exemplary diagram of field signatures stored in the database 130.

An editing tool may include one or more options. The options may include versions of the editing tool and rendering methods used for editing image data. For example, the rendering methods may be a video format, a filter, a video codec, a field type, a depth, a sample rate, and a sample type.

If image data are generated or edited by applying various options, the image data may include different field signatures respectively corresponding to the various options. Therefore, the processor 140 may generate image data by applying various options of an editing tool in order to detect image data modulated by applying various options.

For example, referring to FIG. 6, "Adobe Premiere™" may include CS3, CS4, CS5, CS6, and CC as version information. Further, each version of "Adobe Premiere™" may include tens of thousands or more of rendering methods. That is, the processor 140 may extract a field signature corresponding to "Adobe Premiere™" from image data generated according to each version and various rendering methods of "Adobe Premiere™".

In order to detect modulation with high accuracy, a field signature extracted corresponding to each editing tool needs to be distinguished from a field signature extracted corresponding to another editing tool. Further, in order to rapidly detect modulation, a field signature extracted corresponding to an editing tool needs to include a minimum chunk sequence which can represent each editing tool.

Therefore, the processor 140 may compare a chunk sequence extracted from image data of a specific editing tool with a chunk sequence extracted from image data of another editing tool. Further, the processor 140 may extract a chunk sequence included in a specific editing tool as a field signature corresponding to the editing tool.

Referring to FIG. 6 again, the processor 140 may extract a total of 3 field signatures with respect to the version CS3 of the editing tool "Adobe Premiere™". Further, the processor 140 may extract a total of 2 field signature with respect to version CS4 of the editing tool "Adobe Premiere™".

As such, the processor 140 may extract a total of 18 field signatures with respect to the options of the well-known editing tools such as "Adobe Premiere™", "Sony Vegas™", "Avid Media Composer™", "Edius™", and "Avid Studio™". Further, the processor 140 may store the extracted field signatures in the database 130.

If a new version or a new editing tool is added, the processor 140 may extract field signatures with respect to the new editing tool or the new version and add the extracted field signatures to the database 130.

Figure 7A:
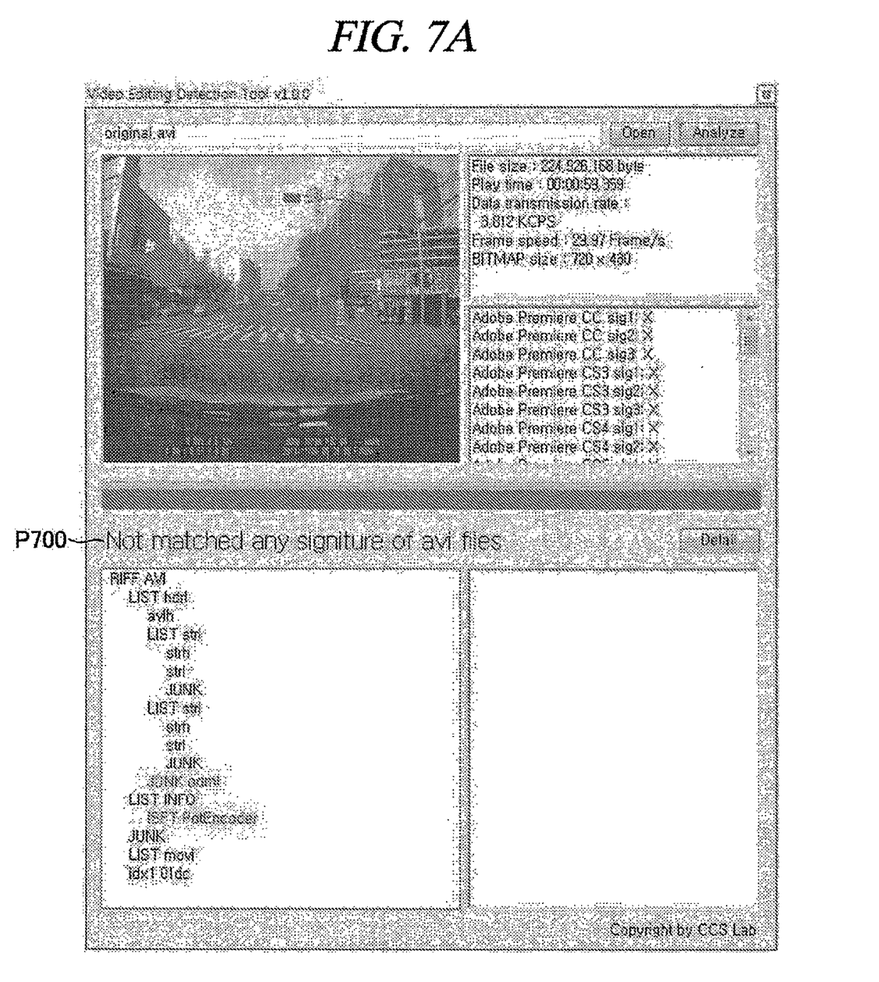
FIG. 7A and FIG. 7B are exemplary diagrams of a user interface for image data integrity verification.
Figure 7B:
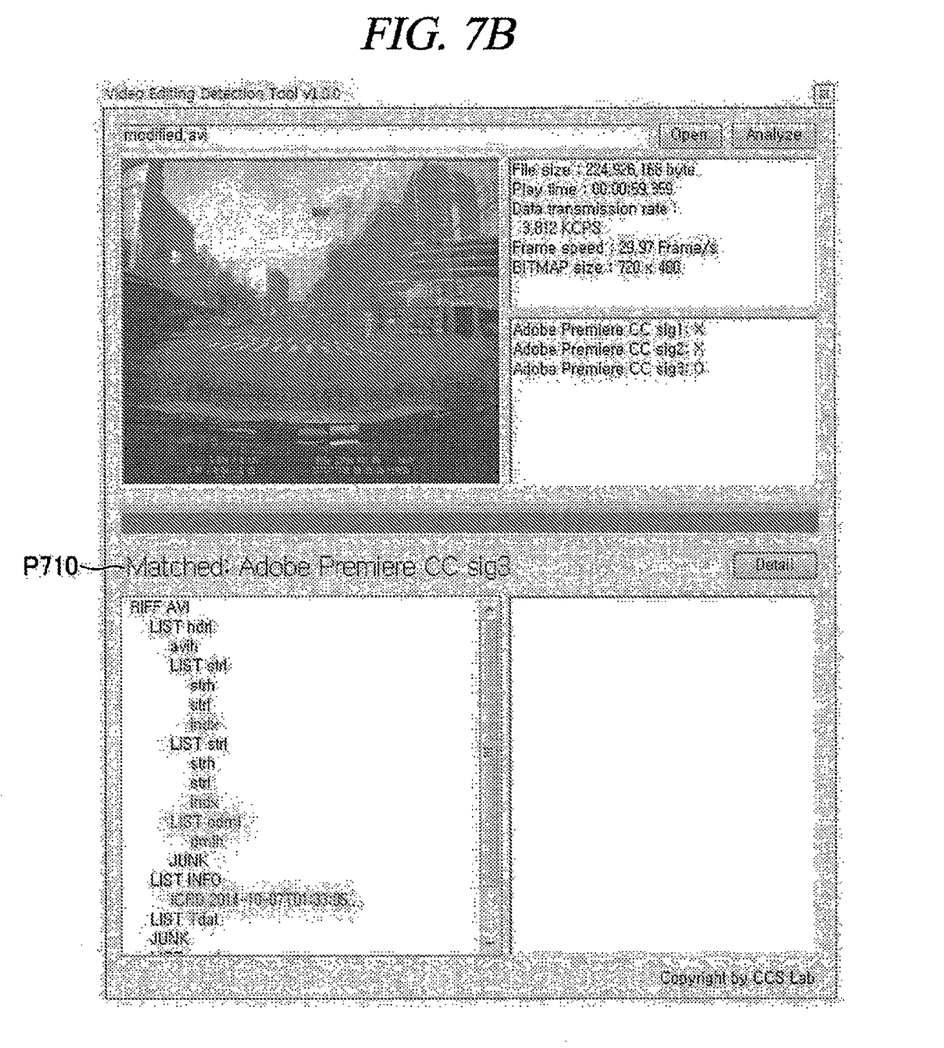

Meanwhile, the processor 140 may generate a user interface for image data integrity verification capable of displaying an integrity verification result of image data to a user. Further, the processor 140 may display the generated user interface through the display module 120.

FIG. 7A and FIG. 7B are exemplary diagrams of a user interface for image data integrity verification.

If the user selects image data to be inspected whether or not they are modulated, the processor 140 may extract a field from the image data. Then, the processor 140 may compare the extracted field with field signatures of the multiple editing tools stored in the database 130. During this process, the processor 140 may display a record of matching with each field signature stored in the database 130 on the user interface for image data integrity verification. For example, the record of matching may include information of the editing tool and whether or not the extracted field is matched with each field signature.

After the completion of the comparison with the fields stored in the database 130, the processor 140 may generate a result of integrity verification. Herein, the result of integrity verification may include whether or not the image data are edited and information of the editing tool used for editing.

For example, if there is no field signature matched with the extracted field, the processor 140 may display a history of the integrity verification process together with an integrity verification result P700 indicating that the image data are original image data without being edited on the user interface for image data integrity verification, as shown in FIG. 7A.

On the other hand, if there is a field signature matched with the extracted field, the processor 140 may display an integrity verification result P710 indicating that the image data are edited image data on the user interface for image data integrity verification, as shown in FIG. 7B.

In this case, the integrity verification result may include information of the editing tool used for editing.

Hereinafter, an integrity verification method in the image data integrity verification device 100 will be described with reference to FIG. 8.

Figure 8:
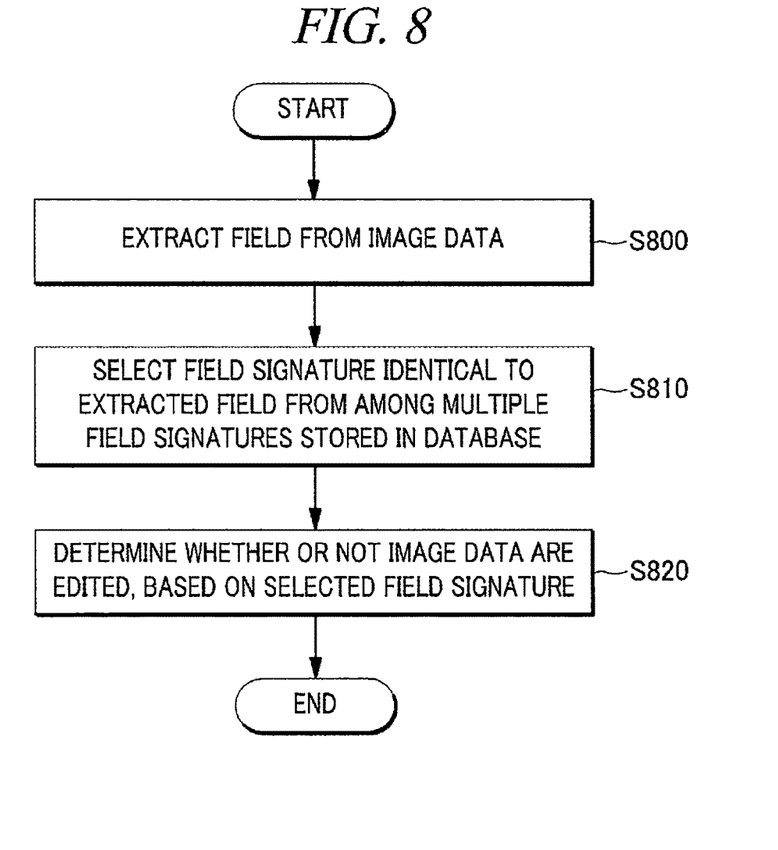
FIG. 8 is a flowchart of the integrity verification method in the image data integrity verification device shown in FIG. 1.

FIG. 8 is a flowchart of the integrity verification method in the image data integrity verification device 100.

The image data integrity verification device 100 extracts a field from image data at step S800.

In this case, the image data integrity verification device 100 may extract the field from one or more chunks included in a header of the image data. The field may include a chunk sequence including one or more chunks.

Further, the chunk may include a chunk identifier, a chunk size, and chunk data. The image data integrity verification device 100 may extract multiple chunk sequences included in the image data as a field of the image data on the basis of multiple chunk identifiers and chunk sizes included in the image data.

The image data integrity verification device 100 matches the extracted field with multiple field signatures stored in the database 130.

To be specific, the image data integrity verification device 100 may select a field signature matched with the extracted field from among the multiple field signatures stored in the database 130 at step S810. Then, if the selected field signature is present, the image data integrity verification device 100 may determine whether or not the image data are edited on the basis of the selected field signature at step S820.

Meanwhile, in order to generate the multiple field signatures stored in the database 130, the image data integrity verification device 100 may generate multiple image data with respect to each of one or more options included in the editing tool. Herein, the options may include versions of the editing tool and rendering methods used for generating image data.

Then, the image data integrity verification device 100 may extract chunk sequences from the image data generated corresponding to the editing tool.

The image data integrity verification device 100 may generate field signatures corresponding to the editing tool on the basis of the extracted chunk sequences. In this case, the image data integrity verification device 100 may select a chunk sequence different from a chunk sequence extracted from an editing tool different from the editing tool from among the chunk sequences extracted corresponding to the editing tool. Then, the image data integrity verification device 100 may generate a field signature corresponding to the editing tool on the basis of the selected chunk sequence.

The image data integrity verification device 100 may store the generated field signatures in the database 130.

According to the image data integrity verification device 100 and the integrity verification method using the same, it is possible to verify integrity of image data and determining whether or not the image data are modulated on the basis of field signatures corresponding to multiple editing tools and stored in the database 130 and a field extracted from a head of the image data. Further, according to the image data integrity verification device 100 and the integrity verification method using the same, a field signature can be added to the database 130, and, thus, it is possible to verify integrity of image data generated by a new editing tool or various options of an editing tool.

Therefore, according to the image data integrity verification device 100 and the integrity verification method using the same, it is possible to verify integrity of image data independently of an image recorder. Further, the image data integrity verification device 100 and the integrity verification method using the same are not affected by an image quality of image data unlike a conventional method of verifying integrity by detecting statistical characteristics and traces of editing in image data. The image data integrity verification device 100 and the integrity verification method using the same can more rapidly detect modulation of image data than the conventional method.

As such, the image data integrity verification device 100 and the integrity verification method using the same enable a user unfamiliar with photos to easily and rapidly detect modulation of image data and an editing tool used for modulation. Therefore, the image data integrity verification device 100 and the integrity verification method using the same can be used for detection of modulation of image data which are relevant to an accident, an event, and a crime and collected by an image collecting device such as a black box or a CCTV.

The present solution can be embodied in a storage medium including instruction codes executable by a computer or processor such as a program module executed by the computer or processor. A data structure can be stored in the storage medium executable by the computer or processor. A computer-readable medium can be any usable medium which can be accessed by the computer and includes all volatile/non-volatile and removable/non-removable media. Further, the computer-readable medium may include all computer storage. The computer storage medium includes all volatile/non-volatile and removable/non-removable media embodied by a certain method or technology for storing information such as a computer-readable instruction code, a data structure, a program module or other data.

The system and method of the present disclosure has been explained in relation to a specific implementations, but its components or a part or all of its operations can be embodied by using a computer system having general-purpose hardware architecture.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A device for integrity verification of image data, comprising:
　a database configured to store multiple field signatures respectively corresponding to multiple editing tools;
　a memory configured to store a program for integrity verification of image data; and
　a processor configured to execute the program stored in the memory,
　where the image data include a header including one or more chunks, and the chunk includes a chunk identifier, a chunk size, and chunk data,
　wherein the processor extracts multiple chunk sequences included in the image data on the basis of chunk identifiers and chunk sizes of the multiple chunks included in the header of the image data, matches the extracted multiple chunk sequences with the multiple field signatures,
　determines whether or not there is a field signature matched with the extracted multiple chunk sequences from among the multiple field signatures, determines whether or not the image data are edited depending on a result of the determination, and detects a kind of an editing tool used for editing the image data on the basis of the field signature matched with the extracted multiple chunk sequences,
　wherein the processor extracts multiple chunk sequences corresponding to the editing tool from image data edited on the basis of the editing tool, and generates the field signature corresponding to the editing tool on the basis of the multiple chunk sequences extracted corresponding to the editing tool, and stores the generated field signature in the database, and
　wherein the processor generates image data corresponding to each of one or more options included in the editing tool and generates the field signature from the image data generated with respect to the one or more options, and the options include at least one of the versions of the editing tool and one or more rendering methods of the editing tool used for generating the image data.

2. The device for integrity verification of image data of claim 1, wherein the processor selects a chunk sequence which is not matched with the multiple field signatures stored in the database from among the chunk sequences extracted corresponding to the editing tool, generates a new field signature corresponding to the editing tool on the basis of the selected chunk sequence, and stores the generated field signature in the database.

3. The device for integrity verification of image data of claim 1, wherein the image data are generated through a black box.

4. The device for integrity verification of image data of claim 1, further comprising:
　a display configured to display a user interface for integrity verification of image data,
　wherein if the processor receives image data from a user, the processor determines whether or not the received image data are edited, and displays whether or not the received image data are edited through the user interface for integrity verification.

5. A method for integrity verification in a device for integrity verification of image data, comprising:
　wherein the image data include a header including one or more chunks, and the chunk includes a chunk identifier, a chunk size, and chunk data,
　extracting multiple chunk sequences included in the image data on the basis of chunk identifiers and chunk sizes of the multiple chunks included in the header of the image data;
　extracting multiple chunk sequences corresponding to an editing tool from image data edited on the basis of the editing tool;
　generating a field signature corresponding to the editing tool on the basis of the multiple chunk sequences extracted corresponding to the editing tool;
　storing the generated field signature in a database;
　matching the multiple chunk sequences extracted from the image data with the multiple field signatures of the database;
　determining whether or not the image data are edited on the basis of whether or not there is a field signature matched with the multiple chunk sequences from among multiple field signatures stored in the database;
　detecting a kind of an editing tool used for editing the image data on the basis of the field signature matched with the extracted multiple chunk sequences;
　wherein the image data are generated corresponding to each of one or more options included in the editing tool and the options include at least one of the versions of the editing tool and one or more rendering methods of the editing tool used for generating the image data.

6. A nontransitory computer-readable storage medium that stores a program for performing the method described in claim 5 on a computer.

* * * * *